United States Patent
Ryon et al.

(10) Patent No.: US 11,053,862 B2
(45) Date of Patent: Jul. 6, 2021

(54) ELECTRONIC FUEL CONTROL FOR GAS TURBINE ENGINES

(71) Applicant: Delavan Inc., West Des Moines, IA (US)

(72) Inventors: Jason A. Ryon, Carlisle, IA (US); Lev Alexander Prociw, Johnston, IA (US)

(73) Assignee: Delavan Inc., West Des Moines, IA (US)

( * ) Notice: Subject to any disclaimer, the term of this patent is extended or adjusted under 35 U.S.C. 154(b) by 468 days.

(21) Appl. No.: 15/714,597

(22) Filed: Sep. 25, 2017

(65) Prior Publication Data
US 2019/0093569 A1    Mar. 28, 2019

(51) Int. Cl.
| | |
|---|---|
| F02C 9/26 | (2006.01) |
| F23R 3/38 | (2006.01) |
| F23N 1/00 | (2006.01) |
| F23D 11/26 | (2006.01) |
| F23R 3/28 | (2006.01) |
| F02C 3/04 | (2006.01) |

(52) U.S. Cl.
CPC ............. *F02C 9/26* (2013.01); *F23D 11/26* (2013.01); *F23N 1/005* (2013.01); *F23R 3/28* (2013.01); *F23R 3/38* (2013.01); *F02C 3/04* (2013.01); *F05D 2220/32* (2013.01); *F05D 2240/35* (2013.01)

(58) Field of Classification Search
CPC .... F02C 9/20; F02C 7/232; F02C 9/26; F02C 9/263; F02C 9/28; F02C 9/32; F23R 3/22; F23R 2900/00013; F23C 5/06
See application file for complete search history.

(56) References Cited

U.S. PATENT DOCUMENTS

| | | | | |
|---|---|---|---|---|
| 2,621,477 A | * | 12/1952 | Powter | F23R 3/286 60/39.23 |
| 3,022,954 A | * | 2/1962 | Webster | F02C 7/22 239/453 |
| 3,129,891 A | * | 4/1964 | Vdodviak | F23D 11/26 239/405 |
| 3,662,959 A | | 5/1972 | Sample, Jr. | |

(Continued)

FOREIGN PATENT DOCUMENTS

| | | |
|---|---|---|
| EP | 2287504 A2 | 2/2011 |
| EP | 3130782 A2 | 2/2017 |

OTHER PUBLICATIONS

Extended European Search Report of the European Patent Office, dated Feb. 19, 2019, issued in corresponding European Patent Application No. 18196323.2.

*Primary Examiner* — Craig Kim
(74) *Attorney, Agent, or Firm* — Locke Lord LLP; Scott D. Wofsy; Georgi Korobanov

(57) ABSTRACT

A fuel injector for a gas turbine engine includes a feed arm defining a conduit extending between an inlet end and an outlet end and a plunger. The plunger is disposed within the conduit and is movable between a plunger first position and a plunger second position. A flow area defined between the plunger and the feed arm is smaller in the plunger first position than in the plunger second position to bias fuel flow through the fuel injector. Fuel systems, gas turbine engines, and methods of controlling fuel flow in gas turbine engine fuel systems are also described.

16 Claims, 6 Drawing Sheets

(56) References Cited

U.S. PATENT DOCUMENTS

| | | | | |
|---|---|---|---|---|
| 3,695,037 A * | 10/1972 | Alverani | F02C 7/22 | 60/39.281 |
| 4,150,539 A * | 4/1979 | Rubins | F23R 3/34 | 60/39.23 |
| 4,305,255 A | 12/1981 | Davies et al. | | |
| 4,350,009 A * | 9/1982 | Holzapfel | F23R 3/22 | 60/39.23 |
| 4,640,093 A * | 2/1987 | Eastman | F02C 9/263 | 251/129.05 |
| 5,000,220 A * | 3/1991 | Eick | G05D 7/005 | 137/501 |
| 5,103,636 A * | 4/1992 | Bak | F02C 9/263 | 244/3.12 |
| 5,125,227 A * | 6/1992 | Ford | F23R 3/26 | 60/39.23 |
| 5,209,893 A * | 5/1993 | Askin | F23C 5/06 | 266/223 |
| 5,243,816 A | 9/1993 | Huddas | | |
| 6,065,451 A * | 5/2000 | Lebrun | F02C 9/263 | 123/454 |
| 8,104,258 B1 * | 1/2012 | Jansen | F02C 7/232 | 137/240 |
| 8,123,150 B2 * | 2/2012 | Khan | F23D 11/38 | 239/265.17 |
| 8,763,631 B2 * | 7/2014 | Mares | F02C 9/263 | 137/220 |
| 2005/0166573 A1 * | 8/2005 | Hommema | F02C 9/263 | 60/39.281 |
| 2010/0037615 A1 * | 2/2010 | Williams | F02C 7/232 | 60/741 |
| 2012/0167580 A1 | 7/2012 | Roesler | | |
| 2013/0126641 A1 * | 5/2013 | Pfeffer | F02C 7/232 | 239/533.9 |
| 2016/0040884 A1 * | 2/2016 | Citeno | F02C 3/04 | 60/772 |
| 2017/0045152 A1 | 2/2017 | Bleeker et al. | | |
| 2017/0051676 A1 * | 2/2017 | Geiger | F02C 7/232 | |
| 2017/0241346 A1 * | 8/2017 | Thompson | F02C 7/224 | |
| 2018/0163635 A1 * | 6/2018 | Marocchini | F02C 9/263 | |

* cited by examiner

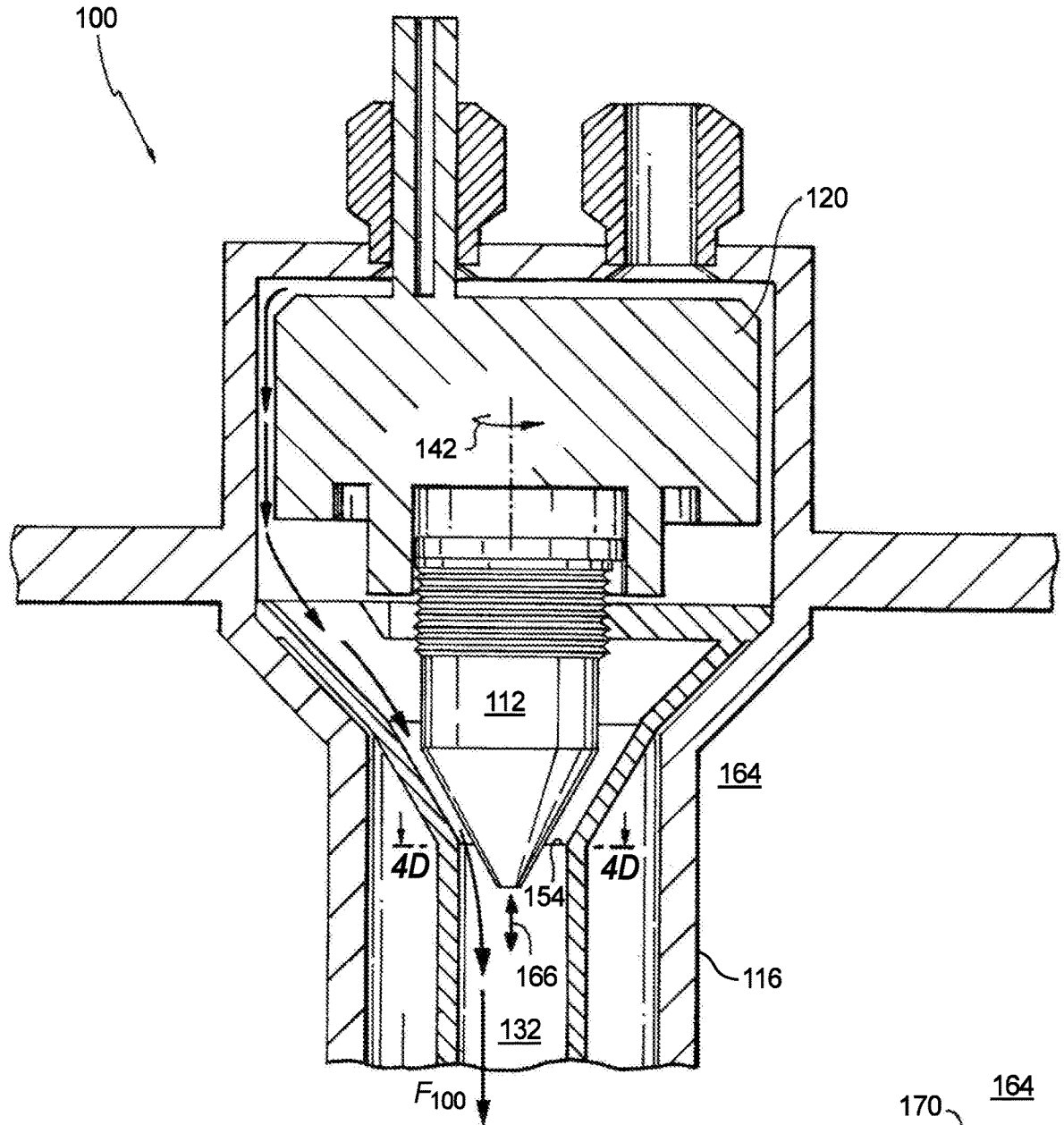
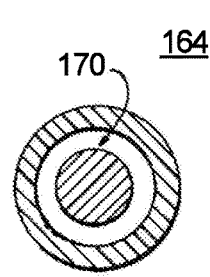
*Fig. 4C*
*Fig. 4D*

ELECTRONIC FUEL CONTROL FOR GAS TURBINE ENGINES

BACKGROUND OF THE INVENTION

1. Field of the Invention

The present disclosure relates to gas turbine engines, and more particularly to fuel injectors for fuel systems in gas turbine engines.

2. Description of Related Art

Gas turbine engines like those used on aircraft commonly employ fuel injectors to provide fuel to the engine combustion section. The combustion section generates high temperature combustion products, which the combustion section communicates to the engine turbine section. The turbine section expands the combustion products, extracting work for powering the engine compressor section and creating thrust. Once expanded, the turbine section issues the combustion products to the external environment.

Since the combustion products are generally provided to the turbine section at high temperatures relative to the materials used in the construction of certain structures in the turbine section, the flow and combustion of fuel in combustion section can require careful control. For example, fuel systems having more than one fuel injector typically employ flow-matched fuel injectors. Flow-matching allows for fuel supplied to the fuel injectors to flow into the engine combustors at matching rates. The matched flow rates in turn reduce the tendency of hot spots to develop in the turbine section, promote uniform temperature distribution, and can improve the reliability of the engine during its service life.

Such conventional methods and systems have generally been considered satisfactory for their intended purpose. However, there is still a need in the art for improved fuel injectors, fuel systems, and methods of controlling fuel flow in gas turbine engines. The present disclosure provides a solution for this need.

SUMMARY OF THE INVENTION

A fuel injector for a gas turbine engine includes a feed arm defining a conduit extending between an inlet end and an outlet end and a plunger. The plunger is disposed within the conduit and is movable between a plunger first position and a plunger second position. A flow area defined between the plunger and the feed arm is smaller in the plunger first position than in the plunger second position to bias fuel flow through the fuel injector.

In certain embodiments, the fuel injector can include an electrical actuator. The electrical actuator can be operably connected to the plunger. The electrical actuator can be arranged to rotate the plunger relative to the feed arm. The electrical actuator can be appurtenant to the fuel injector. The electrical actuator can be severable from the fuel injector. The electrical actuator can include a rotary drive. The rotary drive can couple the electrical actuator to the plunger. The electrical actuator can include a solenoid or a motor. The motor can be a stepper motor.

In accordance with certain embodiments, the feed arm can have female thread engagable with the plunger. The plunger can have male threads engagable with the female threads of the feed arm. The conduit can extend about the female threads. The conduit can taper between a large flow area and a small flow area. The small flow area can be defined between the large flow area and outlet end of the feed arm. The plunger can have a blunt segment, a tapered segment, and a constant diameter segment. It is contemplated that the constant diameter segment can couple the blunt segment to the tapered segment.

It is also contemplated that, in accordance with certain embodiments, the fuel injector can have an electrical connector and an inlet port. The inlet port can be arranged on the inlet end of the feel arm. The inlet port can be in fluid communication with the conduit. A controller can be operably connected to the plunger. The controller can be connected to the plunger through the electrical connector. The controller can be arranged to rotate the plunger within the conduit relative to the feed arm. A threaded annulus can be fixed within the feed arm. The plunger can be seated in the annulus. The conduit can extend about the threaded annulus. A plurality of members spanning the conduit can fix the threaded annulus to the feed arm.

A fuel system for a gas turbine engine includes first and second fuel injectors as described above. Fuel flow areas of each of the first fuel injector and the second fuel injector is adjustable to allow fuel flow through the first fuel injector to bias fuel flow through the first fuel injector relative to fuel flow through the second fuel injector.

A gas turbine engine including a fuel system as described above includes a combustion section and a turbine section in fluid communication with the combustion section. A temperature range within the turbine section is smaller when the fuel flow through the first fuel injector is biased relative to fuel flow through the second fuel injector than when fuel flow through the first fuel injector is matched relative to fuel flow through the second injector.

A method of controlling fuel flow in gas turbine engine fuel system includes flowing fuel in a feed arm having an inlet end and an outlet end through a conduit extending between the inlet end and the outlet end of the feed arm, and moving a plunger disposed within the conduit between first and second positions within the conduit. Movement between the first and second position reduces fuel flow through the fuel injector by reducing a flow area defined between the plunger and the feed arm. Moving the plunger can include rotating the plunger relative to the feed arm. The electrical actuator can thereafter be removed from the fuel injector.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIGS. 4C and 4D are longitudinal and lateral cross-sectional views of the electrical actuator and effective flow area of the fuel injector of FIG. 1, showing the plunger in the second plunger position and effective flow area in the plunger first position, respectively.

DETAILED DESCRIPTION OF THE PREFERRED EMBODIMENTS

Figure 1:
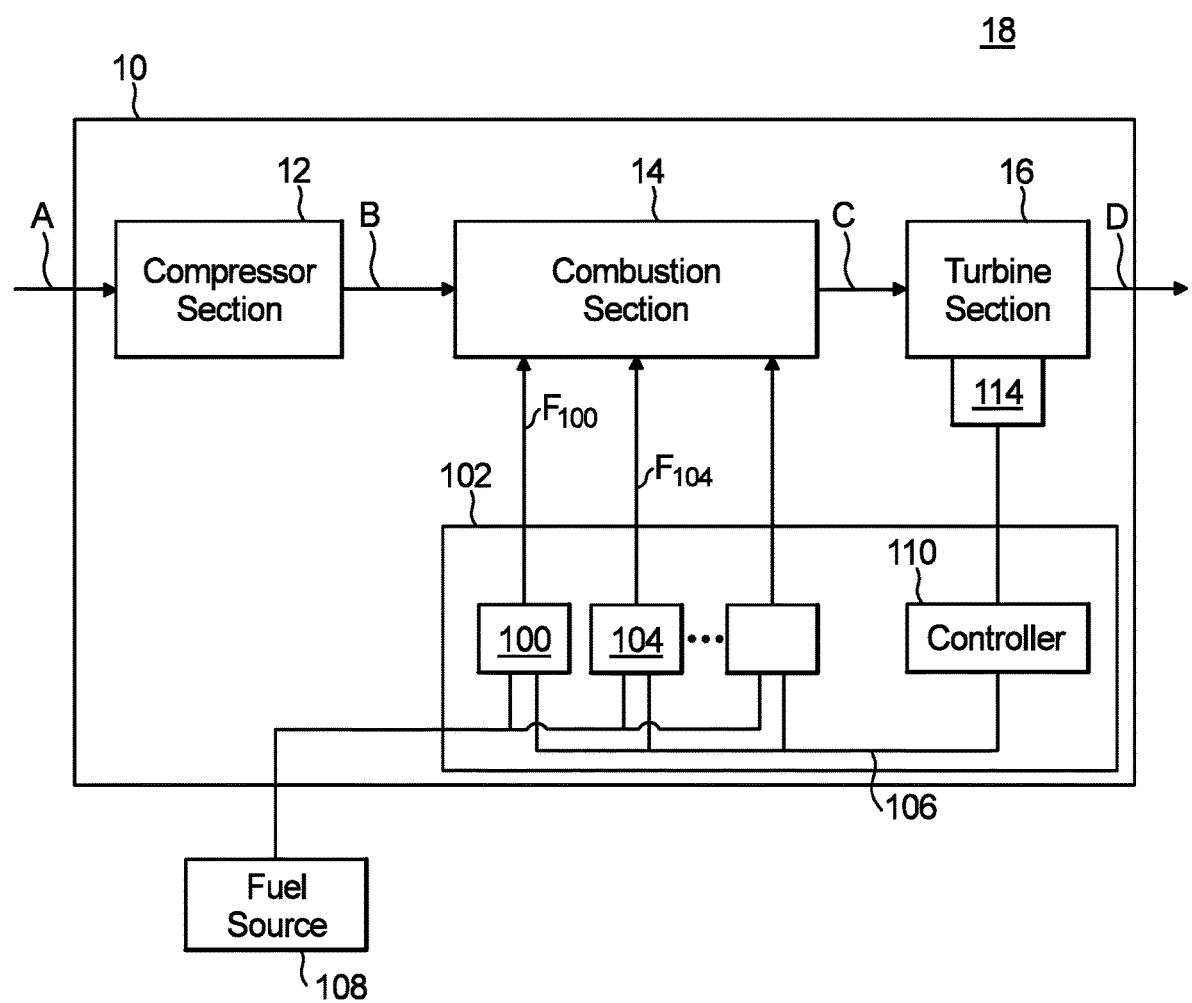
FIG. 1 is a schematic view of an exemplary embodiment of a gas turbine engine constructed in accordance with the present disclosure, showing a fuel system having a fuel injector arranged to provide biased fuel flow to the combustion section of the gas turbine engine.

Reference will now be made to the drawings wherein like reference numerals identify similar structural features or aspects of the subject disclosure. For purposes of explanation and illustration, and not limitation, a partial view of an exemplary embodiment of a fuel injector for a gas turbine engine in accordance with the disclosure is shown in FIG. 1 and is designated generally by reference character 100. Other embodiments of fuel injectors, fuel systems, gas turbine engines, and methods of controlling fuel flow in gas turbine engine fuel systems in accordance with the disclosure, or aspects thereof, are provided in FIGS. 2-5, as will be described. The systems and methods described herein can be used for controlling temperature uniformity within the turbine sections of gas turbine engines, such as aircraft main engines and auxiliary power units, though the present disclosure is not limited to temperature uniformity control or to gas turbine engines for aircraft in general.

Referring to FIG. 1, a gas turbine engine 10 is shown. Gas turbine engine 10 includes a compressor section 12, a combustion section 14, a turbine section 16, and one or more fuel injector 100. Compressor section 12 is in fluid communication with the external environment 18 and combustion section 14. Combustion section 14 is in fluid communication with compressor section 12 and turbine section 16. Turbine section 16 is in fluid communication with combustion section 14 and external environment 18.

Compressor section 12 is arranged to ingest fluid A from external environment 18 and compress fluid A into a compressed fluid flow B. Compressor section 12 communicates fluid flow B to combustion section 14, which receives a fuel flow F, e.g., fuel flows $F_{100}$ and $F_{104}$, from fuel injector 100 and generates a combustion product flow C. Combustion section 14 communicates flow C to turbine section 16, which expands flow C to extract work and/or generate thrust from flow C. Turbine section 16 thereafter communicates an expanded combustion product flow D to external environment 18.

As shown in FIG. 1, fuel injector 100 is included in a gas turbine engine fuel system 102. Fuel system 102 includes at least one matched fuel injector 104, a fuel manifold 106, a fuel source 108, and a controller 110. Fuel injector 100 and matched fuel injector 104 are in fluid communication with combustion section 14 and are arranged to provide fuel flows $F_{100}$ and $F_{104}$ to combustion section 14. Fuel manifold 106 fluidly couples fuel injector 100 and matched fuel injector 104 to fuel source 108.

Matched fuel injector 104 is similar to fuel injector 100 and is flow-matched to fuel injector 100. This means that, for a given fuel supply pressure provided to fuel injector 100 and matched fuel injector 104, flow of fuel from either fuel injector matches that of the other of the fuel injectors. As will be appreciated by those of skill in the art, absent phenomena peculiar to gas turbine engine 10, flow-matched fuel injectors can be expected to provide fuel flows to combustion section 14 that result in a substantially uniform temperature distribution within combustion section 14. As will also be appreciated by those of skill in the art in view of the present disclosure, other factors in a gas turbine engine unrelated to fuel flow through flow-matched fuel injectors can cause induce non-uniform temperature variation within the engine combustion section.

To provide a correction mechanism non-uniform temperature distribution within combustion section 14, at least one of fuel injector 100 and matched fuel injector 104 include a movable plunger 112 (shown in FIG. 2) for biasing fuel flow through the respective fuel injector. Movement of plunger 112 biasing fuel flow through fuel injector, creating the capability to offset temperature non-uniformity within combustion section 14 with variation in fuel flows provided to the combustion section 14, and thereby providing a mechanism to reduce temperature non-uniformity within combustion section 14. In the illustrated exemplary embodiment fuel system 102 includes a controller operatively connected to fuel injector 100 and matched fuel injector 104 and disposed in communication with one or more sensor 114, sensor 114 being arranged to provide information relating to temperature uniformity within combustion section 14 to controller 110.

Figure 2:
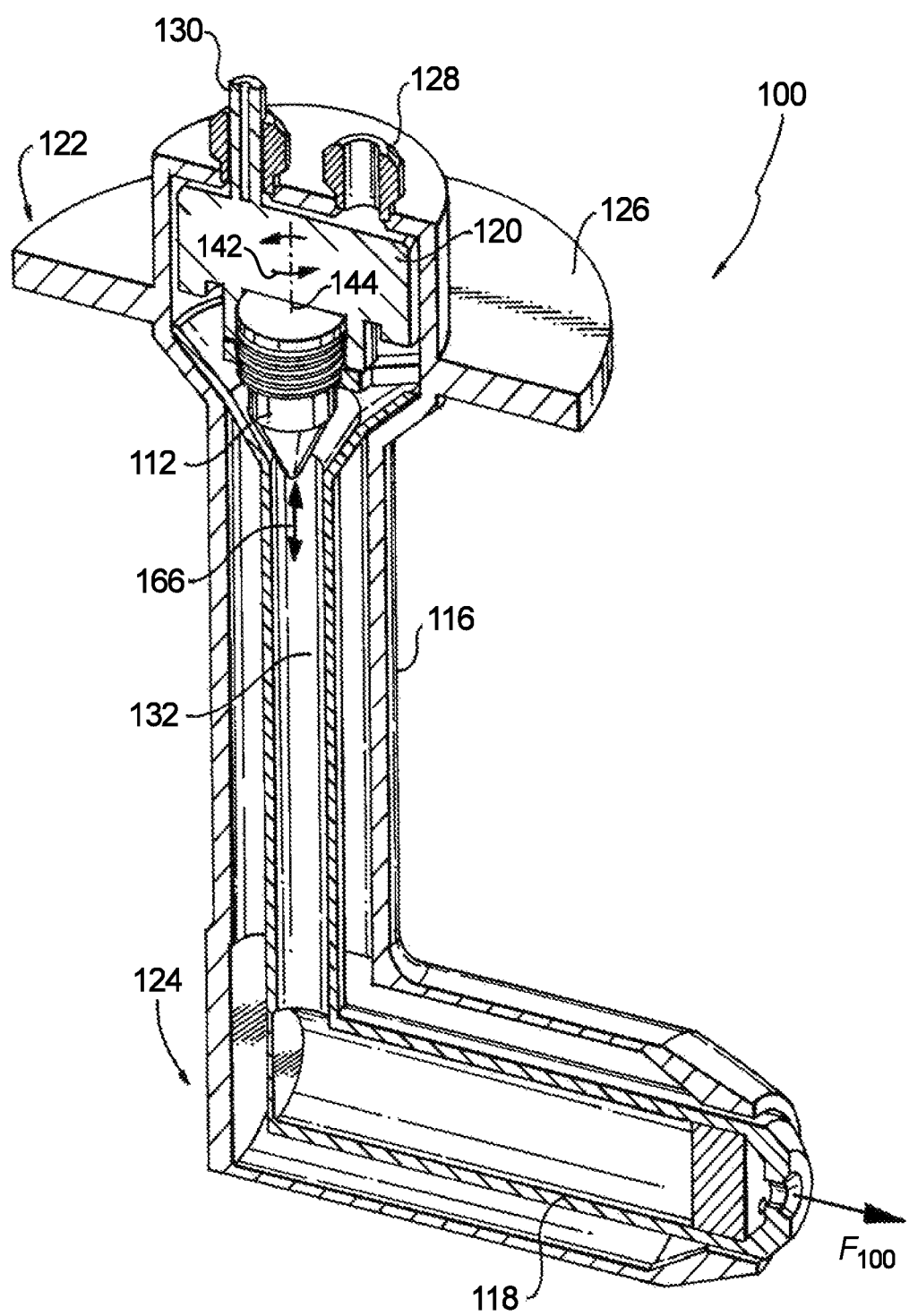
FIG. 2 is a cross-sectional view of fuel injector of FIG. 1, showing a feed arm of the fuel injector with a conduit defined within the feed arm and having a plunger and electrical actuator.

With reference to FIG. 2, fuel injector 100 is shown. Fuel injector 100 includes a feed arm 116, a nozzle 118, plunger 112, and electrical actuator 120. Feed arm 116 has an inlet end 122 and an opposed outlet end 124. A mounting flange 126 extends about inlet end 122 for seating fuel injector 100 within combustion section 14 (shown in FIG. 1). A fuel inlet 128 and an electrical connector 130 are arranged on inlet end 122. A conduit 132 is defined within feed arm 116, extends between inlet end 122 and outlet end 124, and fluidly couples fuel inlet 128 with nozzle 118. Nozzle 118 is seated within outlet end 124 and is arranged to issue fuel flow $F_{100}$, into combustion section 14.

Figure 3:
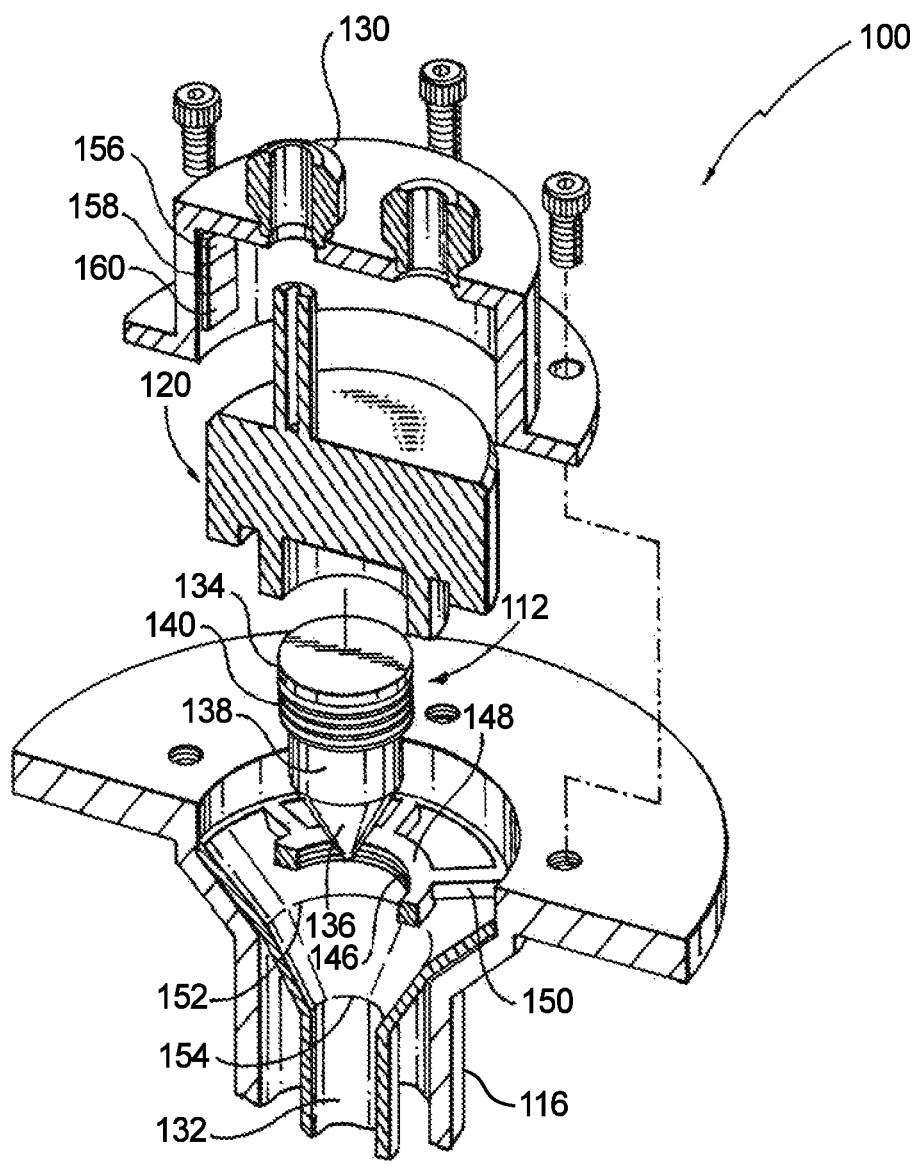
FIG. 3 is a exploded cross-sectional view of the inlet end of the fuel injector of FIG. 1, showing male threads of the plunger and female threads of the feed arm within the conduit.

With reference to FIG. 3, plunger 112 is disposed within feed arm 116 and has a blunt segment 134, a tapered segment 136, and a constant diameter segment 138. Constant diameter segment 138 extends between blunt segment 134 and tapered segment 136, constant diameter segment 138 coupling tapered segment 136 to blunt segment 134. Plunger 112 also has male threads 140, which are engagable with female threads 146 of feed arm 116, and which extend about the periphery of plunger 112 and along at least a portion of constant diameter segment 138. Conduit 132 extends about plunger 112, plunger 112 being arranged to rotate with rotary movement 142 (shown in FIG. 2) relative to feed arm 116 about a rotation axis 144 (shown in FIG. 2) within conduit 132.

Feed arm 116 has female threads 146. Female threads 146 of feed arm 116 are engagable with plunger 112 such that plunger 112 is threadably received within feed arm 116. As a consequence rotary movement 142 (shown in FIG. 2) about rotation axis 144 (shown in FIG. 2) causes plunger 112 to displace (i.e. translate) within conduit 132 relative to feed arm 116. In the illustrated exemplary embodiment female threads 146 are arranged about an inner periphery of a threaded annulus 148, which is fixed to feed arm 116, and are disposed within conduit 132. Plunger 112 is rotatably seated within threaded annulus 148, conduit 132 extending about threaded annulus 148 radially outward of rotation axis 144. A plurality of support members 150 span conduit 132 and fix threaded annulus 148 to feed arm 116, conduit 132 bounded by flow apertures defined between circumferentially adjacent support members 150.

Conduit 132 tapers between a large flow area 152 and a small flow area 154. Small flow area 154 is defined between large flow area 152 and outlet end 124 (shown in FIG. 2) of feed arm 116. Large flow area 152 is defined between small flow area 152 and fuel inlet 128, and is fluidly upstream relative to small flow area 154 such that conduit 132 defines a plunger seat within feed arm 116. It is contemplated that tapered segment 136 intersect at least a portion of large flow area 152 and/or small flow area 154 in an overlap, the magnitude of the overlap corresponding to translation of plunger 112 along rotation axis 144 (shown in FIG. 2). It is contemplated that conduit 132 can include a thin-walled tube segment received within feed arm 116. An insulating gap can be defined between the thin-walled tube segment and the interior of feed arm 116.

Electrical actuator 120 is operably connected to plunger 112. In this respect electrical actuator is arranged to rotate plunger 112 about rotation axis 144 (shown in FIG. 2) with rotary movement 142 (shown in FIG. 2). Rotary movement 142 translates plunger 112 along rotation axis 144 by operation of the threaded engagement of male threads 140 of plunger 112 and female threads 146 of feed arm 116. In certain embodiments, electrical actuator 120 includes a solenoid 156 electrically connected through electrical connector 130 with controller 110 (shown in FIG. 1). In accordance with certain embodiments electrical actuator 120 can include a motor 158, motor 158 being connected through electrical connector 130 with controller 110. Motor 158 can be connected to plunger 112 through a rotary drive 160, and can be a rotary motor or a stepper motor by way of non-limiting example.

Figure 4A:
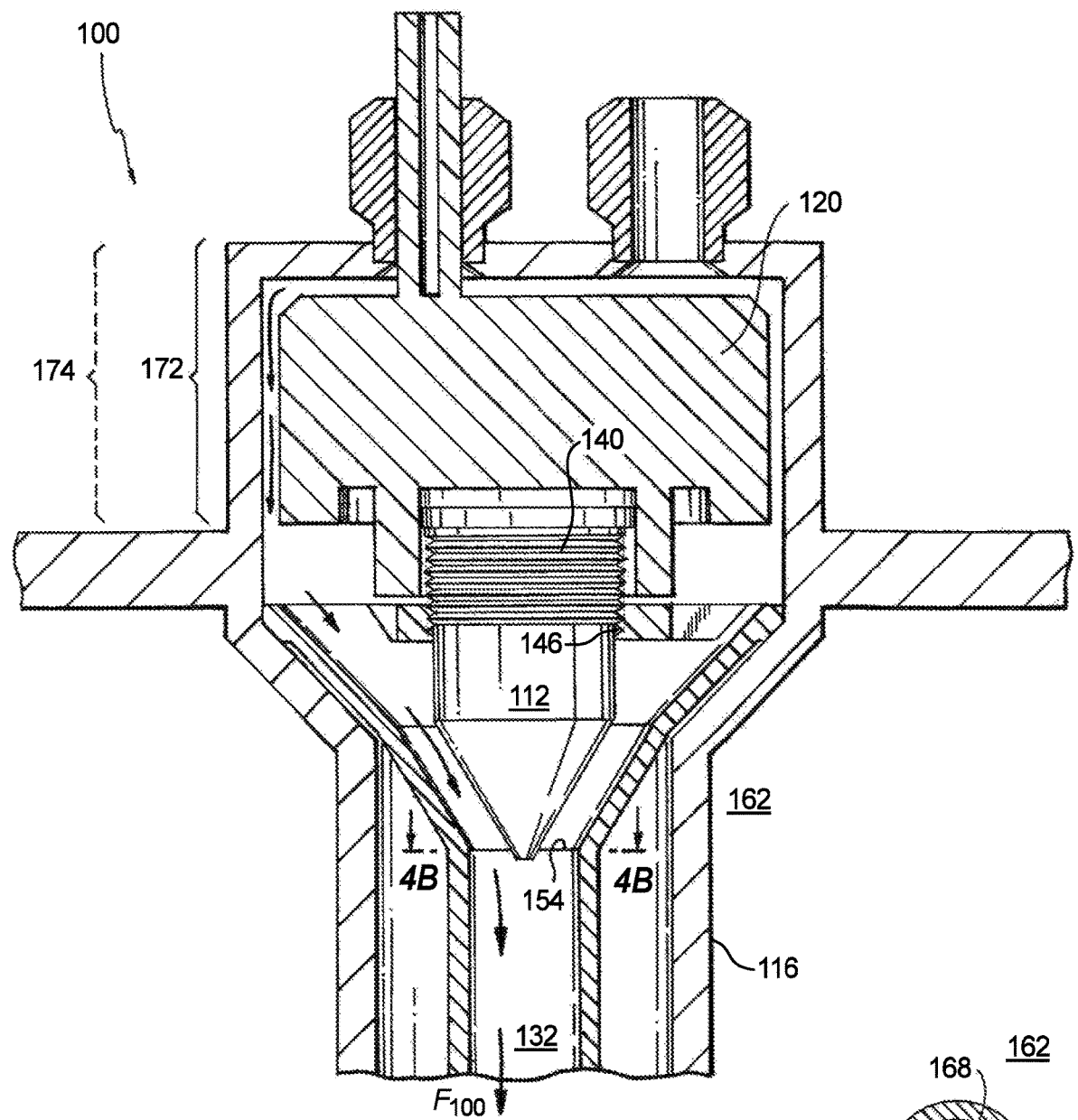
FIGS. 4A and 4B are longitudinal and lateral cross-sectional views of the electrical actuator and effective flow area of the fuel injector of FIG. 1, showing the plunger in the first plunger position and effective flow area in the plunger first position, respectively.
Figure 4B:
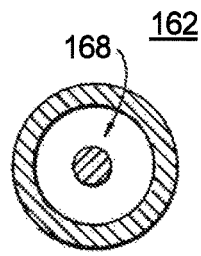

With reference to FIGS. 4A and 4B, plunger 112 is shown in a plunger first position 162. Plunger 112 is movably disposed within conduit 132 for biasing fuel flow $F_{100}$ through fuel injector 100 relative one or more other fuel injectors, e.g., matched fuel injector 104 (shown in FIG. 1) of fuel system 102 (shown in FIG. 1) with otherwise matching fuel flow. Biasing is accomplished by movement of plunger 112 between the plunger first position (shown in FIGS. 4A and 4B) and the plunger second position (shown in FIGS. 4C and 4D) via threaded engagement of male threads 140 of plunger 112 with female threads 146 of feed arm 116 converts rotatory movement 142 (shown in FIG. 2) into translation 166 (shown in FIG. 2). Translation 166 in turn changes the overlap area of tapered segment 136 with small flow area 154, the overlap area defining effective flow area 168 (shown in FIG. 4B) between plunger 112 and feed arm 116, effective flow area 168 increasing or decreasing according to the direction of translation 166.

As shown in FIGS. 4A and 4B, plunger 112 defines a relatively large effective flow area 168 when in plunger first position 162, plunger first position 162 being an axial placement of plunger 112 relative to feed arm 116 along conduit 132. Relatively large effective flow area 168, causes a relative large fuel flow $F_{100}$ to traverse fuel injector 100 and issue into combustion section 14 (shown in FIG. 1).

As shown in FIGS. 4C and 4D, rotary movement 142 by actuator 120 and associated translation 166 of plunger 112 increases the portion of relative small flow area 154 occupied by plunger 112. This defines a relatively small effective flow area 170, reducing the flow rate of fuel flow $F_{100}$ through conduit 132 of fuel injector 100, shown schematically with the relative length of the arrow associated with fuel flow $F_{100}$ in FIG. 4D as compared to the length of the arrow associated with fuel flow $F_{100}$ in FIG. 4B. In certain embodiments movement of plunger 112 between plunger first position 162 (shown in FIG. 4A) and plunger second position 164 can be in response to variation of temperature uniformity within gas turbine section 14 (shown in FIG. 1). It is contemplated that temperature uniformity be modulated by independent biasing of fuel flow $F_{100}$ through fuel injector 100 relative to other fuel injectors, e.g., matched fuel injector 104 (shown in FIG. 1).

With continuing reference to FIG. 4A, it is contemplated that electrical actuator 120 can be appurtenant to fuel injector 100 or severable from fuel injector 100. In this respect fuel injector can have an appurtenant electrical actuator package 172, wherein electrical actuator 120 remains operably connected to plunger 112 during on-wing operation of gas turbine engine 10 (shown in FIG. 1). As will be appreciated by those of skill in the art in view of the present disclosure, this provides on-wing adjustment capability to fuel injector 100. In certain embodiments the adjustment capability is real-time, plunger 112 being movable according to temperature monitoring within gas turbine engine 10.

It is also contemplated that electrical actuator 120 can be severable from fuel injector 100. In severable arrangements fuel injector 100 has a severable electrical actuator package 174, wherein contemplated that electrical actuator 120 is removed from fuel injector 100 subsequent to adjustment of position of plunger 112. For example, electrical actuator 120 can be installed for the engine 'green run' to dial in temperature uniformity in the engine as-built, and thereafter removed from the engine to save weight and reduce complexity. It is contemplated that severable electrical actuator package 174 allow for re-installation of electrical actuator 120 when appropriate, such as during maintenance events or when change in temperature uniformity drive by a less readily correctable cause can be compensated for through fuel flow biasing of one or more fuel injectors in the engine fuel system.

Figure 5:
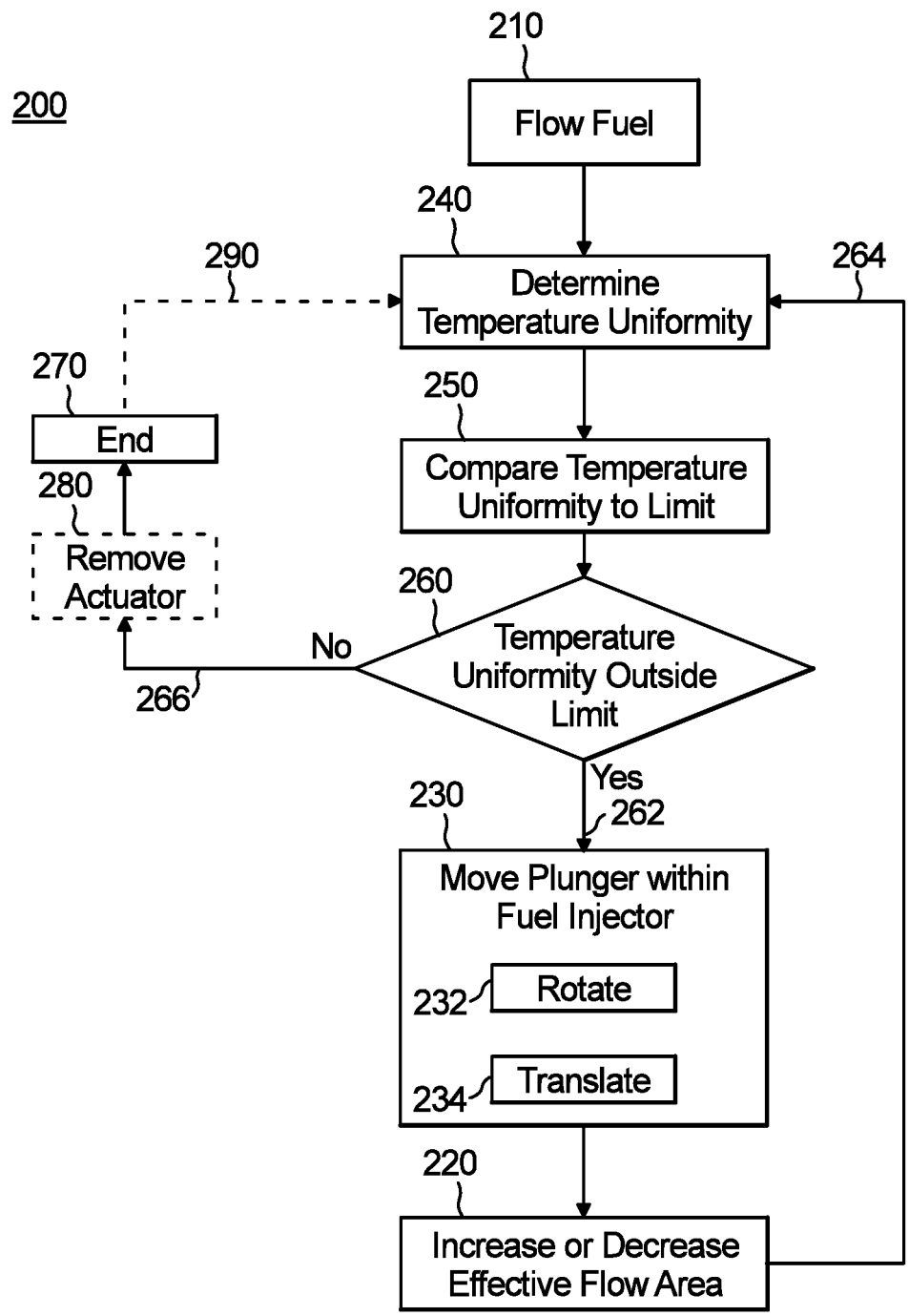
FIG. 5 is flow chart of a method of controlling fuel flow in a gas turbine engine fuel system, showing the steps of the method.

With reference to FIG. 5, a method 200 controlling fuel flow in gas turbine engine fuel system, e.g., fuel system 102 (shown in FIG. 1), is shown. Method 200 includes flowing fuel through a feed arm, e.g., feed arm 116 (shown in FIG. 2) between an inlet end, e.g., inlet end 122 (shown in FIG. 2) and an outlet end, e.g., outlet end 124 (shown in FIG. 2), as shown with box 210. The fuel is flowed through a conduit, e.g., conduit 132 (shown in FIG. 2) defined within the fuel injector extending between the inlet end and outlet ends of the feed arm and about a plunger, e.g., plunger 112 (shown in FIG. 2), disposed within the conduit.

The plunger is moved between a plunger first position, e.g., plunger first position 162 (shown in FIG. 4a), and a plunger second position, e.g., plunger second position 164 (shown in FIG. 4b), within the conduit, as shown with box 230. As fuel flows through the conduit the plunger is moved between the plunger first position and the plunger second position. Movement of the plunger between the plunger first position and the plunger second position changes size of an effective flow area of the fuel injector, e.g., small flow area 154 (shown in FIG. 3), as shown with box 220. The change in the effective flow area changes fuel flow through the fuel injector relative to another fuel injector within the fuel system, independently biasing fuel flow through the fuel injector relative to one or more of the fuel injectors of the fuel system for a common fuel supply pressure. Biasing fuel flow can include, for example, decreasing fuel flow through a single fuel injector within the gas turbine engine fuel system from a relatively large fuel flow, e.g., fuel flow $F_{100}$ (shown in FIG. 4a), to a smaller fuel flow, e.g., fuel flow $F_{100}$ (shown in FIG. 4b). It is contemplated that fuel flow through the injector may become unmatched relative to that through one or more of the other fuel injectors in the fuel system.

Moving the plunger can include rotating the plunger about a plunger axis, e.g., plunger rotation axis 144 (shown in FIG. 2), within the fuel injector, as shown with box 232. Moving the plunger can include translating the plunger along the plunger axis, e.g., via translation 166 (shown in FIG. 2), as shown with box 234. Moving the plunger can include both rotating and translating the plunger, such as through a threaded engagement of a plunger male threaded segment, e.g., male threads 140 (shown in FIG. 2), and female threads of the feed arm, e.g., female threads 146 (as shown in FIG. 2).

In certain embodiments method 200 can include moving the plunger according to temperature uniformity within a gas turbine engine, e.g., within combustion section 14 (shown in FIG. 1) and/or turbine section 16 (shown in FIG. 1), as shown with box 240. The temperature can be acquired from sensors disposed in thermal communication with the turbine section, e.g., sensor 114 (shown in FIG. 1), the sensors being disposed in communication with a controller, e.g., controller 110 (shown in FIG. 1), to provide temperature information to the controller. Temperature uniformity can be determined, for example, at different angular positions relative to the turbine rotation axis and at a common longitudinal station.

It is contemplated that the measured temperature uniformity can be compared to a temperature uniformity limit, as shown with box 250, e.g., a temperature uniformity limit resident within a non-transitory machine-readable memory disposed in communication with the controller. Determination can be made as to whether the temperature uniformity is outside of the temperature range limit, as shown with decision box 260. When the temperature uniformity is outside of the temperature uniformity limit the plunger can be moved, as shown with arrow 262, and the resultant change in temperature uniformity determined by acquisition of a subsequent temperature determination as shown with arrow 264. When the temperature uniformity is within the temperature uniformity limit the plunger position can be retained, as shown with arrow 266.

Optionally, such as when method 200 is utilized during an engine green run or during a maintenance event, the method can terminate, as shown with box 270. It is contemplated that an electronic actuator, e.g., electronic actuator 120 (shown in FIG. 2), can thereafter be removed from the fuel injector, as shown with box 280. It is also contemplated that the electronic actuator can remain operably connected to the fuel injector, as shown with arrow 290, thereby providing real-time biasing to fuel flow through the fuel injector.

The methods and systems of the present disclosure, as described above and shown in the drawings, provide for fuel injectors, fuel systems, gas turbine engines, and methods of controlling fuel flow in gas turbine engine fuel systems with superior properties including the capability to improve temperature uniformity by independently biasing fuel flow through one or more fuel injector relative to one or more otherwise flow-matched fuel injectors. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. A fuel injector for a gas turbine engine, comprising:
   a feed arm;
   a conduit extending between an inlet end and an outlet end; and
   a plunger disposed within the conduit and movable between a plunger first position and a plunger second position,
   wherein the plunger and the conduit define between one another a flow area that is smaller in the plunger second position than in the plunger first position, and wherein the plunger has a blunt segment, a tapered segment, and a constant diameter segment coupling the blunt segment to the tapered segment, wherein the tapered segment is tapered from a wider end to a narrower end in a direction away from the blunt segment.

2. The fuel injector as recited in claim 1, further comprising an electrical actuator operably connected to the plunger and arranged to move the plunger relative to the feed arm.

3. The fuel injector as recited in claim 2, wherein the electrical actuator is appurtenant to the fuel injector.

4. The fuel injector as recited in claim 2, wherein the electrical actuator is severable from the fuel injector.

5. The fuel injector as recited in claim 2, further comprising a rotary drive coupling the electrical actuator to the plunger and arranged to rotate the plunger relative to the feed arm.

6. The fuel injector as recited in claim 2, wherein the electrical actuator includes a solenoid, a rotary motor, or a stepper motor.

7. The fuel injector as recited in claim 1, wherein the feed arm has female threads engagable with the plunger.

8. The fuel injector as recited in claim 7, wherein the plunger has male threads engagable with the female threads of the feed arm.

9. The fuel injector as recited in claim 7, wherein the conduit extends about the female threads.

10. The fuel injector as recited in claim 1, wherein the conduit tapers between a large flow area and a small flow area, the small flow area arranged between the large flow area and the outlet end of the feed arm.

11. The fuel injector as recited in claim 1, further comprising an electrical connector and an inlet port arranged on the inlet end of the feed arm, the inlet port being in fluid communication with the conduit.

12. The fuel injector as recited in claim 11, further comprising a controller operably connected to plunger by the electrical connector, the controller arranged to rotate the plunger within the conduit relative to the feed arm.

13. The fuel injector as recited in claim 1, further comprising a threaded annulus fixed within the feed arm and seating the plunger, the conduit extending about the threaded annulus, a plurality of support members spanning the conduit and coupling the threaded annulus to the feed arm.

14. A fuel system for a gas turbine engine, comprising:
   the fuel injector as recited in claim 1, wherein a flow area of the fuel injector is adjustable to allow fuel flow through the fuel injector to bias fuel flow through the fuel injector relative to fuel flow through a second fuel injector.

15. A gas turbine engine having a fuel system as recited in claim 1, comprising:
   a combustion section;

a turbine section in fluid communication with the combustion section, wherein a temperature range within the turbine section is smaller when fuel flow through the fuel injector is biased relative to fuel flow through a second fuel injector than when fuel flow through the fuel injector is matched to fuel flow through the second fuel injector; and an electrical actuator operably connected to the plunger and arranged to rotate the plunger within the feed arm.

16. The gas turbine engine as recited in claim 15, wherein neither the fuel injector nor the second fuel injector include an electrical actuator.

\* \* \* \* \*